United States Patent [19]

Larach

[11] 4,024,069
[45] May 17, 1977

[54] YTTRIUM TANTALATE PHOSPHORS

[75] Inventor: Simon Larach, Princeton, N.J.

[73] Assignee: RCA Corporation, New York, N.Y.

[22] Filed: July 16, 1975

[21] Appl. No.: 596,283

[52] U.S. Cl. .................................. 252/301.4 R
[51] Int. Cl.² .................................. C09K 11/08
[58] Field of Search .......................... 252/301.4 R

[56] References Cited

UNITED STATES PATENTS

| 3,338,841 | 8/1967 | Brixner | 252/301.4 R |
| 3,357,925 | 12/1967 | Levine et al. | 252/301.4 R |
| 3,586,636 | 6/1971 | Kano et al. | 252/301.4 R |
| 3,758,486 | 9/1973 | Ropp | 252/301.4 R |

OTHER PUBLICATIONS

Sommerdijk et al., "Chem. Abstracts", vol. 77, 1972, p. 170892z.
Rooksby et al., "J. of the Amer. Ceram. Soc.", vol. 47, No. 2, pp. 94–96.
Lykova et al., "Chem. Abstracts", vol. 71, 1969, p. 34153h.
Blasse et al., "Chem. Abstracts", vol. 77, 1972, p. 145716n.

Primary Examiner—J. Cooper
Attorney, Agent, or Firm—G. H. Bruestle; L. Greenspan

[57] ABSTRACT

Phosphors consisting essentially of a host material having a face-centered cubic crystal structure and the empirical formula $YTa_3O_9$ or $Y_3TaO_7$ wherein 0.01 to 0.10 mol percent of the Y is replaced with at least one trivalent activator cation. A portion of the Y up to 20 mol percent may also be replaced with at least one trivalent nonactivator cation, such as Gd, La and Lu. The phosphors may be excited with ultraviolet light, x-rays or cathode rays to emit in the visible and ultraviolet regions of the spectrum depending on the excitation and the activator cations present.

1 Claim, No Drawings

YTTRIUM TANTALATE PHOSPHORS

BACKGROUND OF THE INVENTION

This invention relates to a novel family of phosphors which are activated with one or a combination of trivalent activator cations.

In *Journal of Luminescence* 3, 109 – 131 (1970), an article by G. Blasse et al describes a family of phosphors having a fergusonite-type (tetragonal) crystal structure and the empirical formula $YTaO_4$ wherein a small percent of the Y is replaced with travelent activator cations. Such phosphors are disclosed to be cathodoluminescent and photoluminescent, emitting light in the ultraviolet and visible regions of the spectrum depending upon the excitation and the activator cations present.

SUMMARY OF THE INVENTION

The novel phosphors consist essentially of a host material having a face-centered cubic crystal structure and the empirical formula $YTa_3O_9$ or $Y_3TaO_7$ wherein 0.01 to 10 mol percent of the Y is replaced with at least one trivalent activator cation such as Ce, Dy, Er, Eu, Sm, Tb, Tm and Yb. A portion of the Y up to 20 mol percent may also be replaced with at least one trivalent nonactivator cation such as Gd, La and Lu.

The novel phosphors may be excited with ultraviolet light, x-rays and cathode rays to emit in the visible and ultraviolet regions of the spectrum depending on the excitation and the activator cations present. The phosphors may be used in a wide range of applications including cathode-ray tubes, photoluminescent devices and image intensifiers.

DETAILED DESCRIPTION OF THE PREFERRED EMBODIMENTS

Investigations of the phase composition of the binary system $Y_2O_3$-$Ta_2O_5$ using a special flux-synthesis method have yielded two compounds $Y_3TaO_7$ and $YTa_3O_9$ which are suitable host materials for preparing phosphors. The method used comprises heating a mixture of $Y_2O_3$ and $Ta_2O_5$ with a flux comprised of $Na_2CO_3$, S and $K_3PO_4$ in an alumina crucible at about 1150° C for about 4 hours, and then cooling to room temperature. This method requires lower temperatures and shorter times for a crystallization of the reaction product than the method disclosed in the above-cited Blasse et al article. In one series of experiments, tabulated in the Table, the mol ratio of $Y_2O_3$ to $Ta_2O_5$ was varied and the crystal structure of the reaction product was examined. The only pure phase obtained was for 1.00 $Y_2O_3$/0.38 $Ta_2O_5$. Subsequent data indicate that the pure phase is $Y_3TaO_7$ and has a face-centered cubic structure.

An example of a synthesis of the non-activated host material is as follows: Combine 1.1292 grams $Y_2O_3$, 0.8393 grams $Ta_2O_5$, 0.704 grams $Na_2CO_3$, 0.704 grams S, 0.352 grams $K_3PO_4$. After thorough mixing, transfer the mixture to an alumina crucible and fire in a mullite tube in a nitrogen atmosphere at 1150° C for about 4 hours. The product is $Y_3TaO_7$.

To prepare a phosphor with the foregoing $Y_3TaO_7$ host material, simply substitute equimolar portions of the desired trivalent activator cation for 0.01 to 10 mol percent of the yttrium present, and then proceed as indicated. Substituting europium for yttrium produces a red emitter, substituting terbium for yttrium produces a green emitter, and substituting cerium for yttrium produces a blue emitter.

A $YTa_3O_9$ host material may substitute for the above-described $Y_3TaO_7$ host material. The $YTa_3O_9$ host material may be prepared in a similar manner by mixing one mol part $Y_2O_3$, three mol parts $Ta_2O_5$ with a flux comprised of $Na_2CO_3$, S and $K_3PO_4$ and then firing the mixture in a crucible at about 1150° C for about 4 hours and then cooling the mixture. Phosphors are obtained by substituting equimolar portions of the desired trivalent activator cation for 0.01 to 10 mol percent of the yttrium present.

Both host materials $Y_3TaO_7$ and $YTa_3O_9$ may be further modified by substituting equimolar portions of one or more trivalent nonactivator cations, i.e., not giving rise to luminescence, for up to 20 mol percent of the yttrium present. Such substitutions are generally not preferred, but, in some applications, it may be desirable to modify in a desirable way the properties of the product in this manner. Some suitable trivalent nonactivator cations are gadolinium, lanthanum and lutetium.

Both host materials $Y_3TaO_7$ and $YTa_3O_9$ may be converted to phosphors by substituting one or more trivalent activator cations, i.e. giving rise to luminescence, for 0.01 to 10 mol percent of the yttrium present. Some suitable trivalent activator cations and the usual emission color shown in parenthesis are cerium (blue) dysprosium (green to blue), erbium (green), europium (orange to red), samarium (orange), terbium (green), thulium (blue) and ytterbium (yellow to green).

For both host materials and the phosphors made with these host materials, the flux used in the synthesis is important. The flux and generally the steps of the synthesis are the same as for producing $Y_2O_2S$ and yttrium oxysulfide phosphors. The fluxes disclosed in U.S. Pat. No. 3,502,590 to M. R. Royce et al are suitable for producing the novel phosphors. Generally, compositions which yield alkali metal sulfides and polysulfides upon heating can be used as the flux.

The firing temperature and time are not critical and may be varied over a wide range. The firing should provide a sufficient heat treatment to crystallize the desired phosphor from the batch. Time and temperature may be traded off against each other. Temperatures of 900° to 1300° C and times of 1 to 10 hours may be used.

EXAMPLE 1

Mix 0.8384 gram $Y_2O_3$, 0.5522 gram $Ta_2O_5$ with 0.75 milliliter of a solution containing 15 milligrams of trivalent europium, as a salt there of, per milliliter of solution, and then dry the mixture at about 150° C. Add the following flux ingredients: 0.704 gram $Na_2CO_3$, 0.704 gram S and 0.352 gram $K_3PO_4$. Grind the mixture in a mortar, place in an alumina crucible, cover the crucible, place the covered crucible in a mullite tube and fire in a nitrogen atmosphere at about 1150° C for about 4 hours and then cool to room temperature. The reaction product is washed with water to remove soluble material. The insoluble residue is principally $Y_{2.97}Eu_{0.03}TaO_7$, which is red emitting when excited with ultraviolet light from a mercury vapor lamp or with cathode rays.

EXAMPLE 2

The formulation and procedure are the same as for Example 1 except substitute 0.76 milliliter of a solution containing 15 milligrams terbium, as a salt thereof, per milliliter for the europium-containing solution. The insoluble residue is principally $Y_{2.97}Tb_{0.03}TaO_7$ which is green emitting when excited with ultraviolet light from a mercury-vapor lamp or with cathode rays.

EXAMPLE 3

Formulation and procedure are the same as for Example 1 except substitute 0.71 milliliter of a solution containing 15 milligrams cerium, as a salt thereof per milliliter for the europium-containing solution. The insoluble residue is principally $Y_{2.97}Ce_{0.03}TaO_7$ which is blue emitting when excited with ultraviolet light from a mercury vapor lamp or with cathode rays or with x-rays.

EXAMPLE 4

Formulation and procedure are the same as for Example 1 except substitute 0.7384 gram $Y_2O_3$ plus 0.2163 gram $Ga_2O_3$ for the 0.838 gram of $Y_2O_3$. The insoluble residue is principally $Y_{2.70}Ga_{0.27}Eu_{0.03}TaO_7$ which is red emitting when excited with ultraviolet light of with x-rays or with cathode rays.

EXAMPLE 5

To 0.2738 gram $Y_2O_3$ and 1.6566 grams $Ta_2O_5$, add 0.87 milliliter of 0.1 M $Tb^{+3}$, proceeding as in Example 1. This yields $Y_{.97}Tb_{.03}Ta_3O_9$, which is green emitting.

Table

| $Y_2O_3$ | $Ta_2O_5$ | Structure |
|---|---|---|
| 1.00 | — | $Y_2O_2S$ |
| 1.00 | 0.1 | $Y_2O_2S$ plus face-centered cubic |
| 1.00 | 0.3 | $Y_2O_2S$ plus face-centered cubic |
| 1.00 | 0.38 | Face-centered cubic only |
| 1.00 | 0.45 | Face-centered cubic plus primitive cubic |
| 1.00 | 0.60 | Face-centered cubic plus primative cubic |
| 1.00 | 1.00 | Face-centered cubic plus primitive cubic |

I claim:

1. A phosphor consisting essentially of a host material having a face-centered cubic crystal structure and represented by the empirical formula $[Y_{1-x}Ce_x]_3TaO_7$, wherein $x=0.0001$ to 0.100 mol.

* * * * *